(12) United States Patent
Huang

(10) Patent No.: US 9,081,168 B2
(45) Date of Patent: Jul. 14, 2015

(54) LIGHT SOURCE SYSTEM WITH MULTIBAND FILTERS AND RELAY LENS ASSEMBLIES FOR A STEREOSCOPIC IMAGE

(71) Applicant: DELTA ELECTRONICS, INC., Taoyuan Hsien (TW)

(72) Inventor: Junejei Huang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 253 days.

(21) Appl. No.: 13/856,169

(22) Filed: Apr. 3, 2013

(65) Prior Publication Data

US 2014/0185014 A1 Jul. 3, 2014

(30) Foreign Application Priority Data

Dec. 28, 2012 (TW) .............................. 101150745 A

(51) Int. Cl.
  G03B 21/28  (2006.01)
  G02B 13/00  (2006.01)
  H04N 9/31   (2006.01)
  H04N 13/04  (2006.01)
  G03B 21/20  (2006.01)
  F21S 10/00  (2006.01)
  G02B 27/22  (2006.01)
  G02B 26/00  (2006.01)

(52) U.S. Cl.
  CPC ........... *G02B 13/0095* (2013.01); *F21S 10/007* (2013.01); *G02B 27/2207* (2013.01); *G02B 27/2264* (2013.01); *G03B 21/208* (2013.01); *G03B 21/28* (2013.01); *H04N 9/3114* (2013.01); *H04N 9/3197* (2013.01); *H04N 13/0459* (2013.01); *G02B 26/008* (2013.01)

(58) Field of Classification Search
  CPC ............. G02B 13/0095; G02B 26/008; G02B 27/2207; H04N 9/3114; H04N 9/3197; H04N 13/0459; H04N 2209/043; G03B 21/28; G03B 21/208; G03B 21/14; G03B 21/00; F21S 10/007
  USPC ............................. 353/98, 20, 84; 359/491.01
  See application file for complete search history.

(56) References Cited

U.S. PATENT DOCUMENTS

| | | | |
|---|---|---|---|
| 2005/0036118 A1* | 2/2005 | Ishikura et al. | 353/81 |
| 2005/0237487 A1 | 10/2005 | Chang | |
| 2006/0221312 A1* | 10/2006 | Matsuura et al. | 353/119 |
| 2006/0244929 A1* | 11/2006 | Sawai et al. | 353/84 |
| 2006/0262284 A1* | 11/2006 | Onishi et al. | 353/99 |
| 2008/0239067 A1 | 10/2008 | Lipton | |
| 2008/0239068 A1 | 10/2008 | Lipton | |

* cited by examiner

*Primary Examiner* — William C Dowling
*Assistant Examiner* — Magda Cruz
(74) *Attorney, Agent, or Firm* — Muncy, Geissler, Olds & Lowe, P.C.

(57) ABSTRACT

A light source system for stereoscopic image is disclosed, which includes a first multiband filter, a second multiband filter, a first relay lens assembly, a second relay lens assembly, a light source module, a light outputting portion and a light valve device. The first and the second relay lens assemblies are disposed between the first multiband filter and the second multiband filter. The light source module and the first multiband filter are together disposed at one side of the first relay lens assembly. The light outputting portion and the second multiband filter are together disposed at one side of the second relay lens assembly. The light valve device is disposed between the first and the second relay lens assemblies. Therefore, the light source system configures the light path by controlling the light valve device and produces beams with different bands.

12 Claims, 21 Drawing Sheets

LIGHT SOURCE SYSTEM WITH MULTIBAND FILTERS AND RELAY LENS ASSEMBLIES FOR A STEREOSCOPIC IMAGE

CROSS-REFERENCES TO RELATED APPLICATIONS

This application claims priority to Taiwan Patent Application No. 101150745 filed on Dec. 28, 2012, which is hereby incorporated herein by reference in its entirety.

BACKGROUND OF THE INVENTION

1. Field of the Invention

The present invention provides a light source system, and more particularly, to a light source system for a stereoscopic image.

2. Descriptions of the Related Art

Over recent years, stereoscopic image displays have become a hot topic in research. The primary principle of stereoscopic image displays is as follows: a left-eye view-angle image and a right-eye view-angle image are fed by a display apparatus to the left eye and the right eye of a viewer respectively. Then, when the two images with the same image content but different parallaxes are viewed by both eyes of the viewer, depth will be perceived in the resulting image by the viewer because of the visual characteristics of the human eye. Thus, the resulting image is perceived as a stereoscopic image.

Conventionally, a light source system for a stereoscopic image projector generally has a light source and a color wheel. The light source is adapted to generate a light beam to the color wheel. The color wheel has at least six filter regions adapted to transform the light into light beams of six different wavebands respectively. Then, the light beams of different wavebands are sequentially transferred to a light modulator of the projector where the light beams are transformed into left-eye view-angle images and right-eye view-angle images respectively.

The color wheel of the aforesaid light source system must be made to have a relatively large diameter so that the light beams can impinge on the color wheel at a small solid angle (i.e., at a large light spot size) to reduce the light loss of the light beams. However, the large diameter of the color wheel leads to a large volume of the light source system correspondingly. Furthermore, the aforesaid light source system is unable to output light beams of different wavebands simultaneously so it cannot be used in combination with a plurality of light modulators.

Accordingly, it is important to provide a light source system for a stereoscopic image that can overcome at least one of the aforesaid shortcomings.

SUMMARY OF THE INVENTION

An objective of the present invention is to provide a light source system for a stereoscopic image that allows a projector to generate the stereoscopic image.

Another objective of the present invention is to provide a light source system for a stereoscopic image that has a small volume.

A further objective of the present invention is to provide a light source system for a stereoscopic image that has a small light loss.

Yet a further objective of the present invention is to provide a light source system for a stereoscopic image that can output a plurality of light beams of different wavebands simultaneously.

To achieve one of the aforesaid objectives, a light source system for a stereoscopic image of the present invention may comprise the following: a first multiband filter and a second multiband filter; a first relay lens assembly that is disposed between the first multiband filter and the second multiband filter, wherein the first relay lens assembly comprises an optical axis; a first portion and a second portion, wherein the first portion and the second portion are disposed at both sides of the optical axis respectively, and the first portion and the first multiband filter are opposite to each other; a second relay lens assembly, disposed between the first multiband filter and the second multiband filter, wherein the second relay lens assembly comprises an optical axis; a first portion and a second portion wherein the first portion and the second portion of the second relay lens assembly are disposed at both sides of the optical axis respectively of the second relay lens assembly, and the first portion of the second relay lens assembly and the second multiband filter are opposite to each other; a light source module, wherein the light source module and the first multiband filter are disposed at one side of the first relay lens assembly together; a light outputting portion, wherein the light outputting portion and the second multiband filter are disposed at one side of the second relay lens assembly together; and a light valve device that is disposed between the first relay lens assembly and the second relay lens assembly and comprising a transmission and reflection area.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. It shall be appreciated that the dimensional relationship among the individual components and the numbers of the components shown in drawings are provided only for ease of understanding but not to limit the actual scale, sizes, and number of components.

Figure 1:
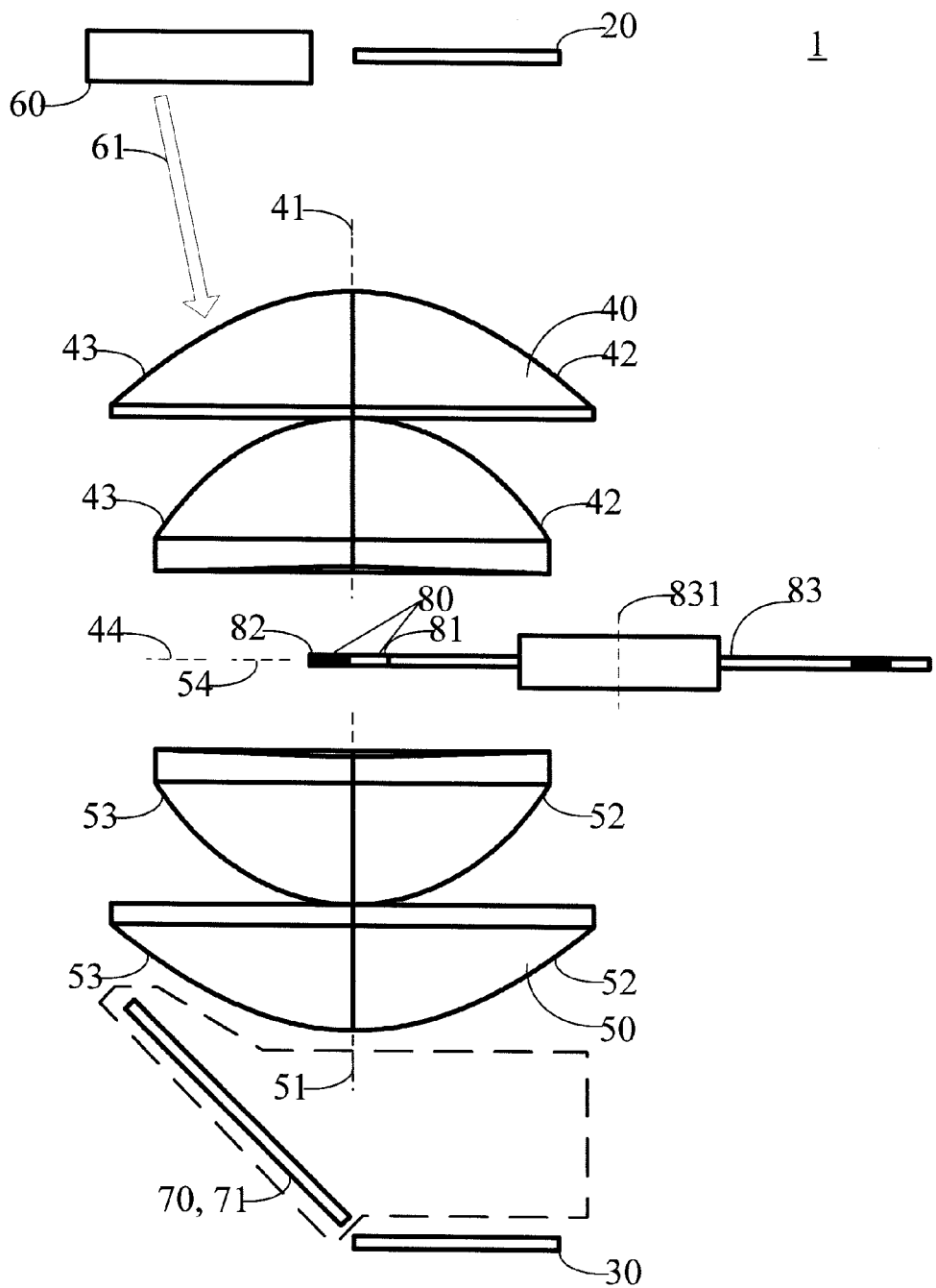
FIG. 1 is a schematic view of a light source system for a stereoscopic image according to the first embodiment of the present invention.

FIG. 1 illustrates a schematic view of a light source system for a stereoscopic image according to the first embodiment of the present invention. In the first embodiment, a light source system for a stereoscopic image 1 is proposed. The light source system 1 may be used in a projector (not shown) and may comprise a first multiband filter 20, a second multiband filter 30, a first relay lens assembly 40, a second relay lens assembly 50, a light source module 60, a light outputting portion 70 and a light valve device 80. The technical contents of these components will be described sequentially as follows.

The first multiband filter 20 and the second multiband filter 30 may be disposed opposite to each other. The first multiband filter 20 and the second multiband filter 30 each may be a transparent plate on which the multiple layers of the optical films are disposed to allow light beams of multiple specific wavebands to pass therethrough and light beams of multiple specific wavebands to be reflected therefrom.

Figure 2:
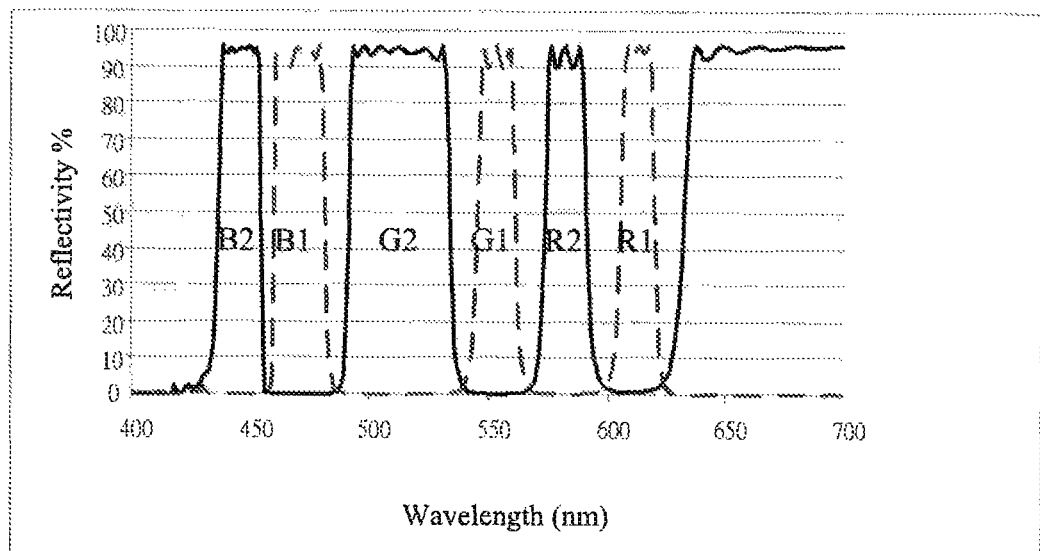
FIG. 2 is a diagram illustrating the reflectivity versus wavebands of a first multiband filter and a second multiband filter of the light source system for a stereoscopic image of FIG. 1.

FIG. 2 illustrates the reflectivity versus the wavebands of the first multiband filter and the second multiband filter of the light source system for a stereoscopic image of FIG. 1. The first multiband filter 20 corresponds to a dotted line, and as can be seen, it allows the light beams of R1, G1 and B1 wavebands to be reflected therefrom and light beams of R2, G2 and B2 wavebands to pass therethrough. Conversely, the second multiband filter 20 corresponds to a solid line, and as can be seen, it allows light beams of R2, G2 and B2 wavebands to be reflected therefrom and the light beams of R1, G1 and B1 wavebands to pass therethrough. R1 and R2 both belong to wavebands of red light but don't overlap with each other; G1 and G2 both belong to wavebands of green light but don't overlap with each other; and B1 and B2 both belong to wavebands of blue light but don't overlap with each other.

With reference back to FIG. 1, the first relay lens assembly 40 and the second relay lens assembly 50 are both disposed between the first multiband filter 20 and the second multiband filter 30. The first relay lens assembly 40 and the second relay lens assembly 50 each may consist of a plurality of lenses. The first relay lens assembly 40 may preferably consist of lenses that have the same shapes and number as those of the second relay lens assembly 50.

The first relay lens assembly 40 may have an optical axis 41, a first portion 42, a second portion 43 and a first focal plane 44, with the first portion 42 and the second portion 43 disposed at both sides of the optical axis 41 respectively. The first portion 42 is also opposite to (i.e., faces) the first multiband filter 20 so that the first portion 42 can be optically coupled to the first multiband filter 20.

The second relay lens assembly 50 may have an optical axis 51, a first portion 52, a second portion 53 and a second focal plane 54, with the first portion 52 and the second portion 53 disposed at both sides of the optical axis 51 respectively. The first portion 52 is also opposite to the second multiband filter 30 so that the first portion 52 can be optically coupled to the second multiband filter 30. Furthermore, the axis 51 and the axis 41 may be coaxial with each other.

The light source module 60 and the first multiband filter 20 are disposed at one side of the first relay lens assembly 40 together; that is, the light source module 60 and the first multiband filter 20 are both disposed at the front side of the first relay lens assembly 40. The light source module 60 may also be disposed next to the first multiband filter 20 and opposite to the second portion 43 of the first relay lens assembly 40. The light source module 60 can be optically coupled to the second portion 43.

The light source module 60 may be a solid-state light source module or a non-solid-state light source module. In the case of a non-solid-state light source module, the light source module 60 may comprise a high-pressure mercury lamp or a xenon lamp. In the case of a solid-state light source module, the light source module 60 may comprise a laser diode (or a light emitting diode (LED)) and a fluorescence element.

The light source module 60 is used to provide an input light beam 61 to the second portion 43 of the first relay lens assembly 40. The input light beam 61 may be a white light (or at least contains light beams of red, green and blue wavebands) and may be a collimated light beam. Furthermore, the input light beam 61 propagates to the second portion 43 along a path that intersects with the optical axis 41 of the second relay lens assembly 40.

The light outputting portion 70 and the second multiband filter 30 are disposed at one side of the second relay lens assembly 50 together; that is, the light outputting portion 70 and the second multiband filter 30 are both disposed at the back side of the second relay lens assembly 50. The light outputting portion 70 may also be disposed next to the second multiband filter 30 and opposite to the second portion 53 of the second relay lens assembly 50. The light outputting portion 70 can be optically coupled to the second portion 53.

The light outputting portion 70 is used to allow light beams to pass therethrough and be outputted from the light source system for a stereoscopic image 1. In this embodiment, the light outputting portion 70 comprises a reflector 71 and a passage (i.e., the portion encircled by a dotted line in FIG. 1) in which the reflector 71 is disposed, and can control the direction in which the light beam is outputted.

The light valve device 80 is disposed between the first relay lens assembly 40 and the second relay lens assembly 50; that is, they are disposed at the back side of the first relay lens assembly 40 but at the front side of the second relay lens assembly 50. Furthermore, the light valve device 80 may be disposed on the first focal plane 44 of the first relay lens assembly 40 or the second focal plane 54 of the second relay lens assembly 50. The light valve device 80 may further be disposed on the first focal plane 44 and the second focal plane 54 simultaneously.

The light valve device 80 may have a transmission area 81 and a reflection area 82. The transmission area 81 and the reflection area 82 may be disposed at both sides of the optical axis 41 of the first relay lens assembly 40 respectively or at both sides of the optical axis 51 of the second relay lens assembly 50 respectively. The transmission area 81 and the reflection area 82 are both optically coupled to the first relay lens assembly 40 and the second relay lens assembly 50. The transmission area 81 and the reflection area 82 will exchange their positions when the light source system for a stereoscopic image 1 operates.

Figure 3:
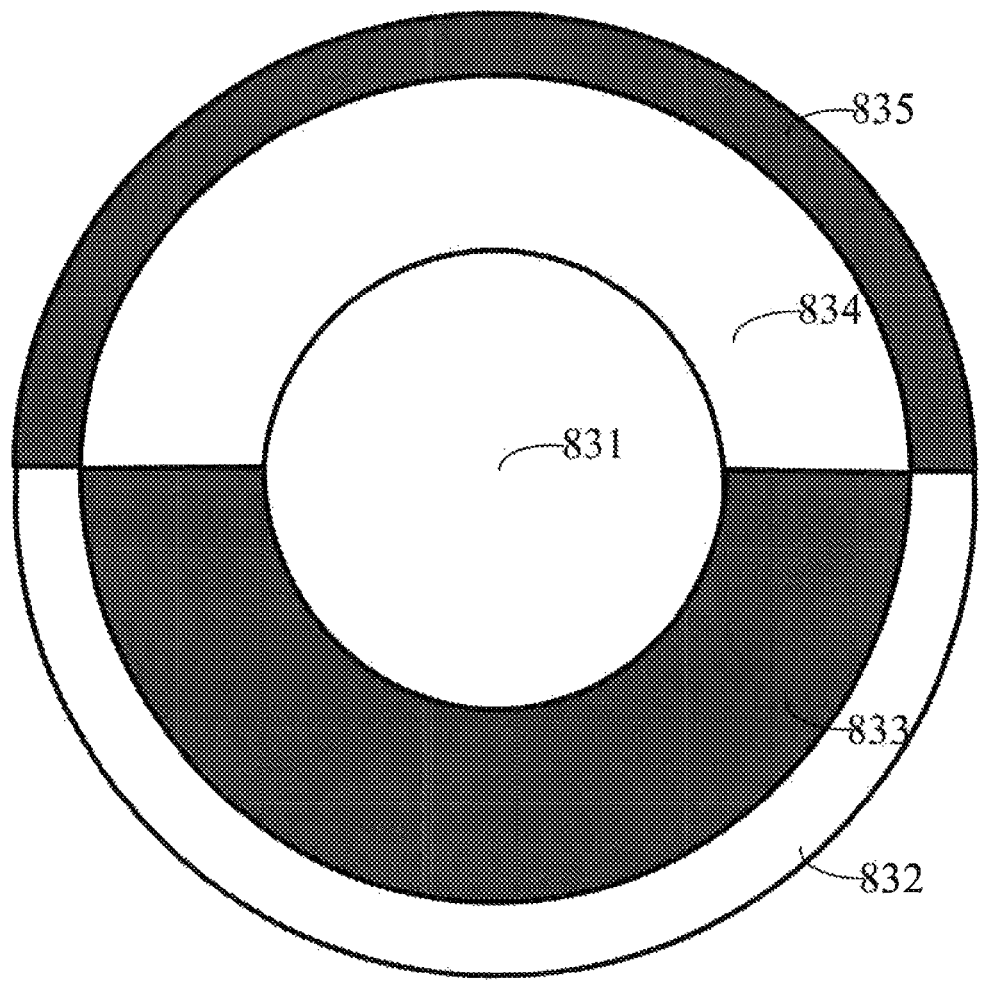
FIG. 3 is a schematic view of a color wheel module of the light source system for a stereoscopic image of FIG. 1.

In this embodiment, the light valve device 80 may be a color wheel module 83. FIG. 3 illustrates a schematic view of a color wheel module of the light source system for the stereoscopic image of FIG. 1. The color wheel module 83 has a color wheel axis 831, a first transmission portion 832, a first reflection portion 833, a second transmission portion 834 and a second reflection portion 835. The first reflection portion 833 and the second transmission portion 834 are disposed at both sides of the color wheel axis 831 respectively. The first transmission portion 832 is disposed at the outer side of the first reflection portion 833, while the second reflection portion 835 is disposed at the outer side of the second transmission portion 834.

The first transmission portion 832 and the second transmission portion 834 each may be a structure such as a transparent glass that allows red, green and blue light beams to pass therethrough. The first reflection portion 833 and the second reflection portion 835 each may be a structure such as a reflector that allows read, green and blue light beams to be reflected therefrom. The first transmission portion 832 and the second transmission portion 834 form the transmission area 81 of the light valve device 80 together, while the first reflection portion 833 and the second reflection portion 835 form the reflection area 82 of the light valve device 80 together.

When the light source system for a stereoscopic image 1 operates, the light source module 60 provides the input light beam 61 continuously, and the color wheel module 83 rotates about the color wheel axis 831 continuously to change the positions of the transmission area 81 and the reflection area 82 of the light valve device 80. Therefore, the operation process of the light source system for a stereoscopic image 1 may be divided into a first timing sequence and a second timing sequence according to the positions of the transmission area 81 and the reflection area 82.

Figure 4A:
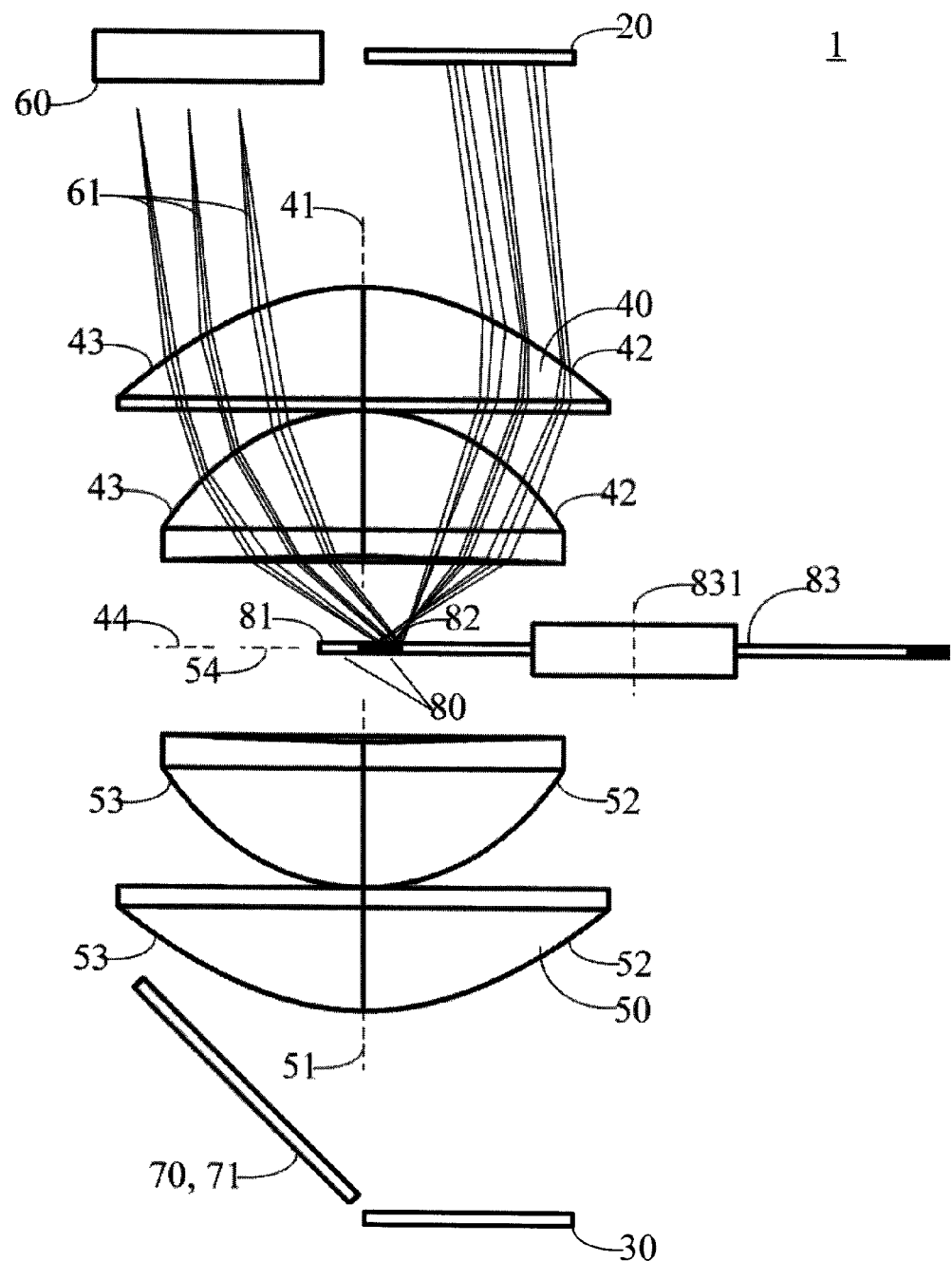
FIGS. 4A, 4B and 4C are three schematic views respectively illustrating the optical path of the light source system for a stereoscopic image of FIG. 1 at the first timing sequence.
Figure 4B:
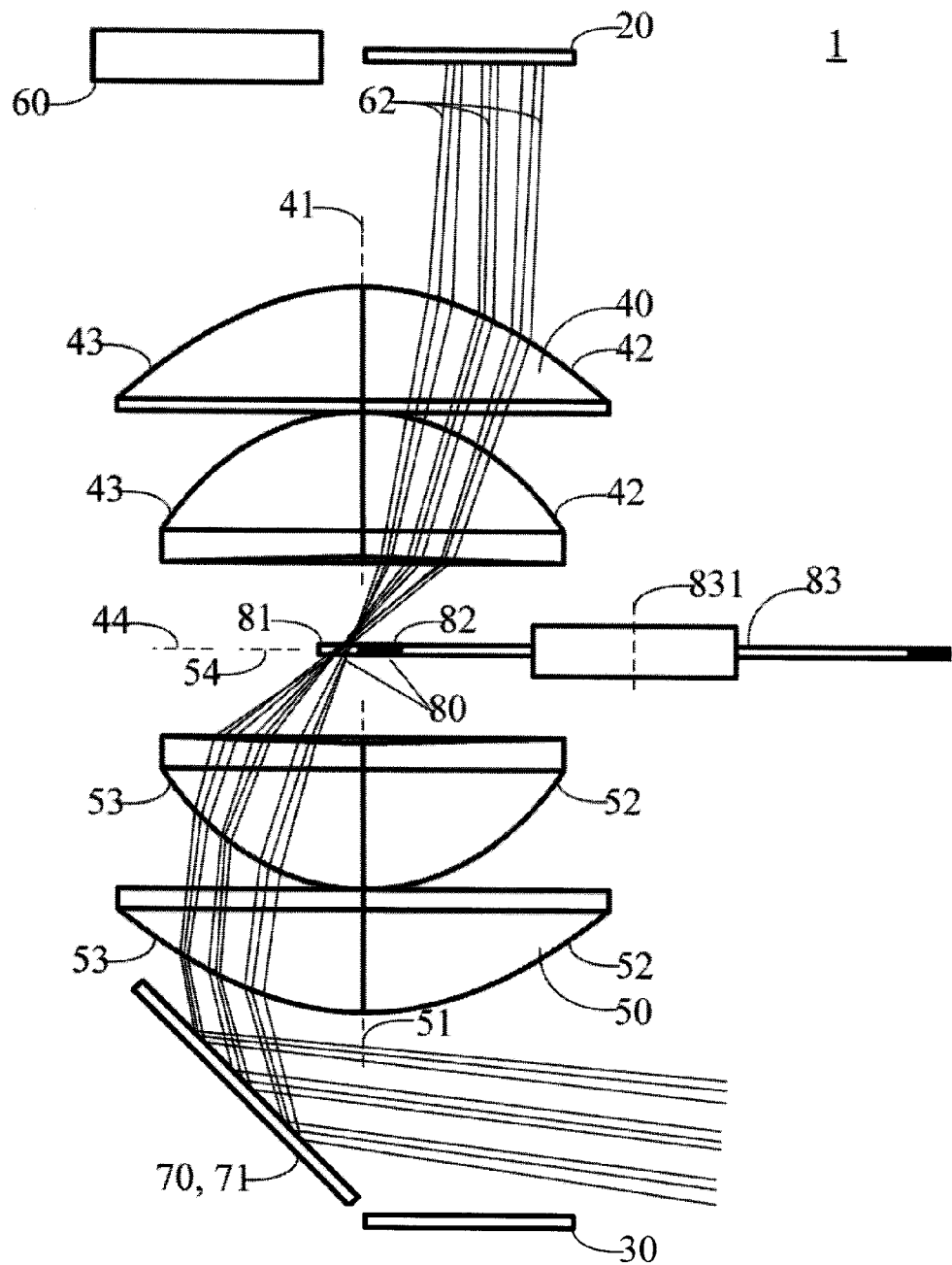
Figure 4C:
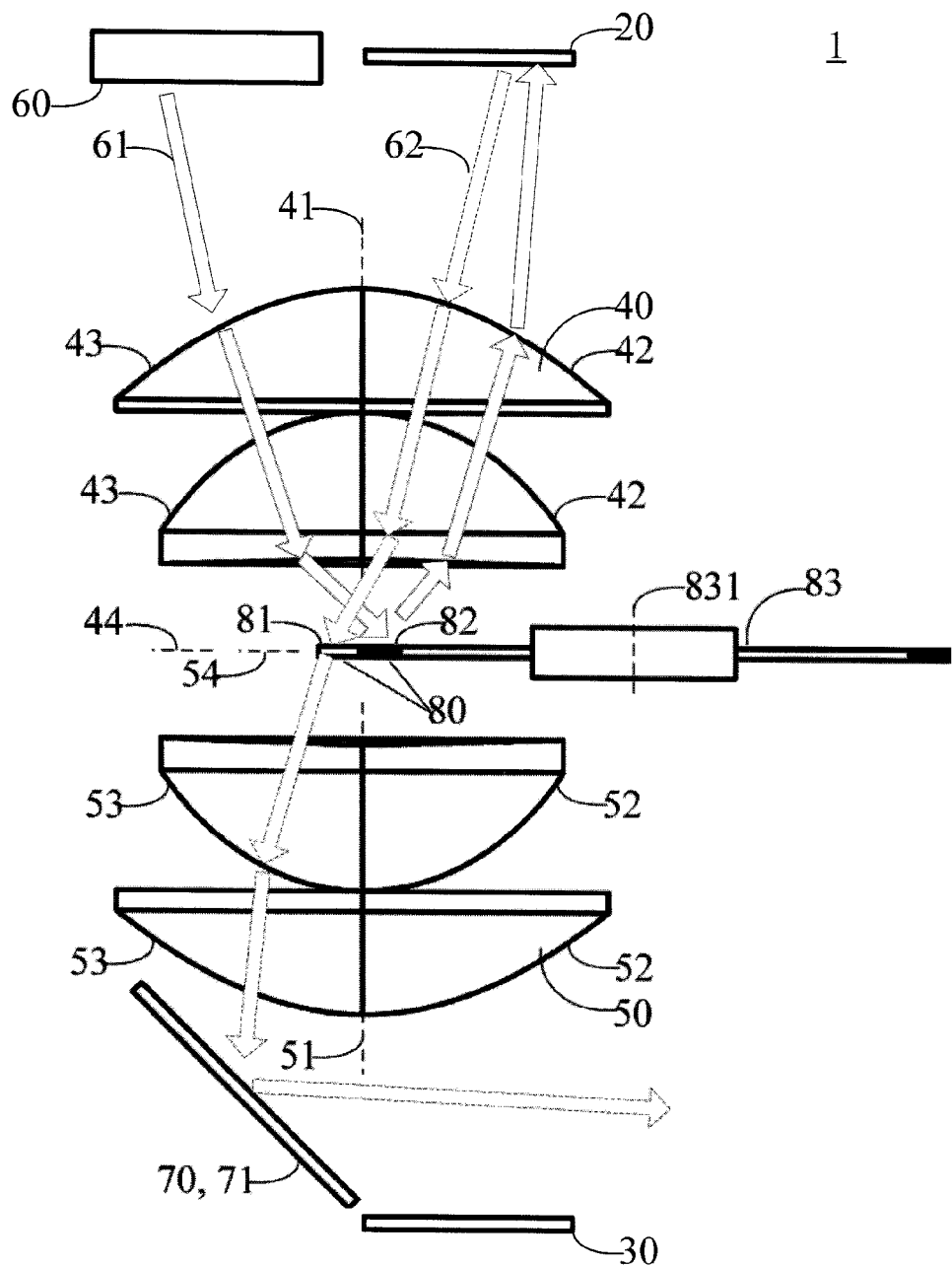

FIGS. 4A, 4B and 4C illustrate three schematic views respectively of the optical path of the light source system for the stereoscopic image of FIG. 1 at the first timing sequence.

At the first timing sequence, the transmission area 81 is the first transmission portion 832 of the color wheel module 83 (as shown in FIG. 3), while the reflection area 82 is the first reflection portion 833 of the color wheel module 83 (as shown in FIG. 3).

As shown in FIG. 4A, the input light beam 61 first propagates to the second portion 43 of the first relay lens assembly 40 and is then converged into the reflection area 82 by the second portion 43. Subsequently, the input light beam 61 is reflected by the reflection area 82 to the first portion 42 of the first relay lens assembly 40 so that the input light beam 61 is collimated by the first portion 42 and transferred to the first multiband filter 20.

As shown in FIG. 4B, after being transferred to the first multiband filter 20, a portion (i.e., light beams of R1, G1 and B1 wavebands) of the input light beam 61 is reflected by the first multiband filter 20. The portion of the input light beam 61 that is reflected will be referred to as a first light beam 62 hereinafter.

The first light beam 62 propagates to the reflector 71 through the first portion 42 of the first relay lens assembly 40, the transmission area 81, and the second portion 53 of the second relay lens assembly 50 sequentially. Finally, the first light beam 62 is reflected by the reflector 71 and then exits from the light source system for a stereoscopic image 1 between the second multiband filter 30 and the first portion 52.

In general, the optical paths of the input light beam 61 and the first light beam 62 at the first timing sequence are as shown in FIG. 4C.

After being outputted from the light source system for the stereoscopic image 1, the first light beam 62 is transferred to a beam splitting prism (not shown) of the projector where it is split into a plurality of light beams. That is, the first light beam 62 is split into three light beams of R1, G1 and B1 wavebands. The three light beams are transferred to three light modulators (e.g., DMD, LCoS or the like, not shown) of the projector respectively so that a first view-angle image is outputted by the projector.

Figure 4D:
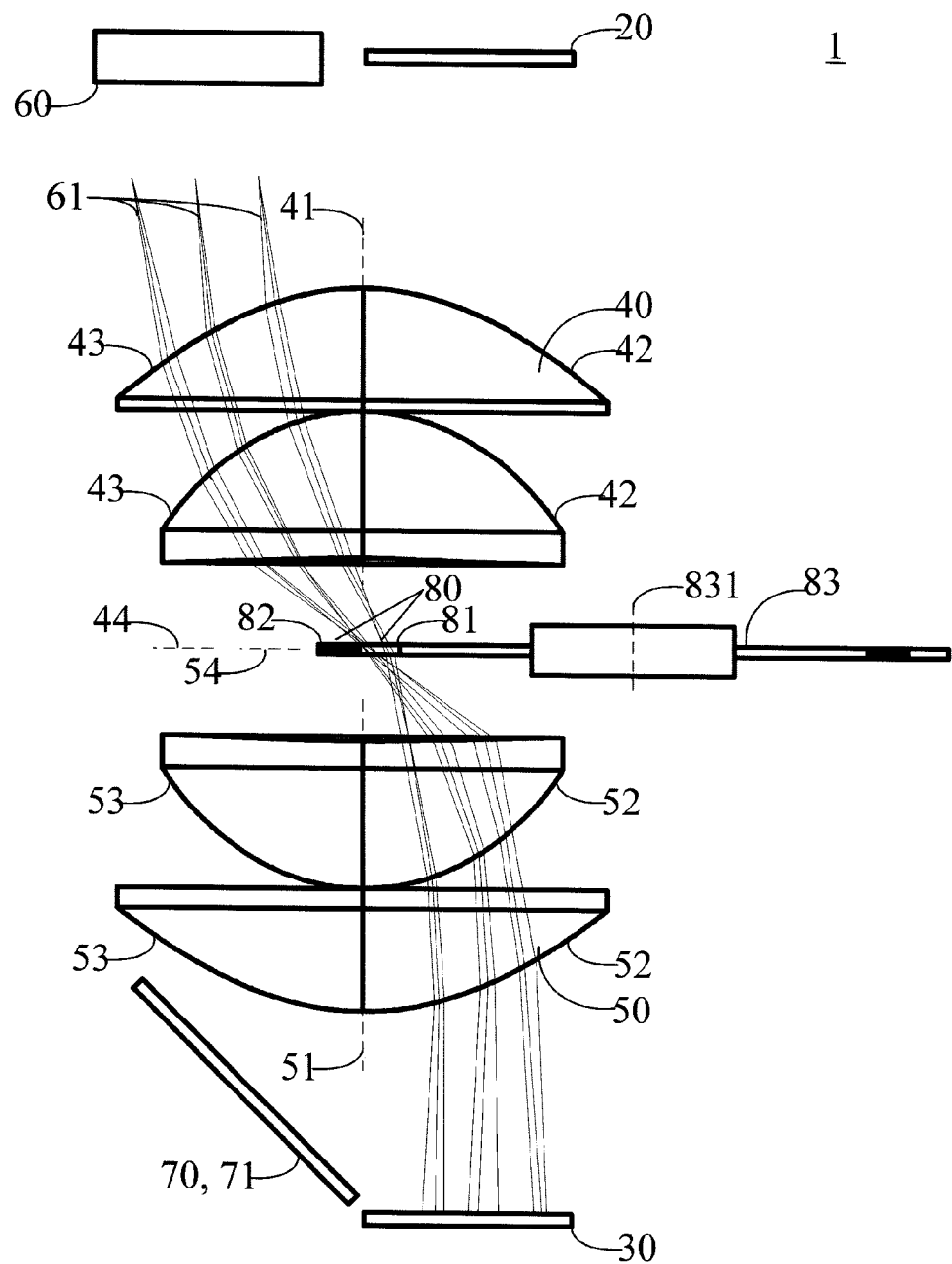
FIGS. 4D, 4E and 4F are three schematic views respectively illustrating the optical path of the light source system for a stereoscopic image of FIG. 1 at the second timing sequence.
Figure 4E:
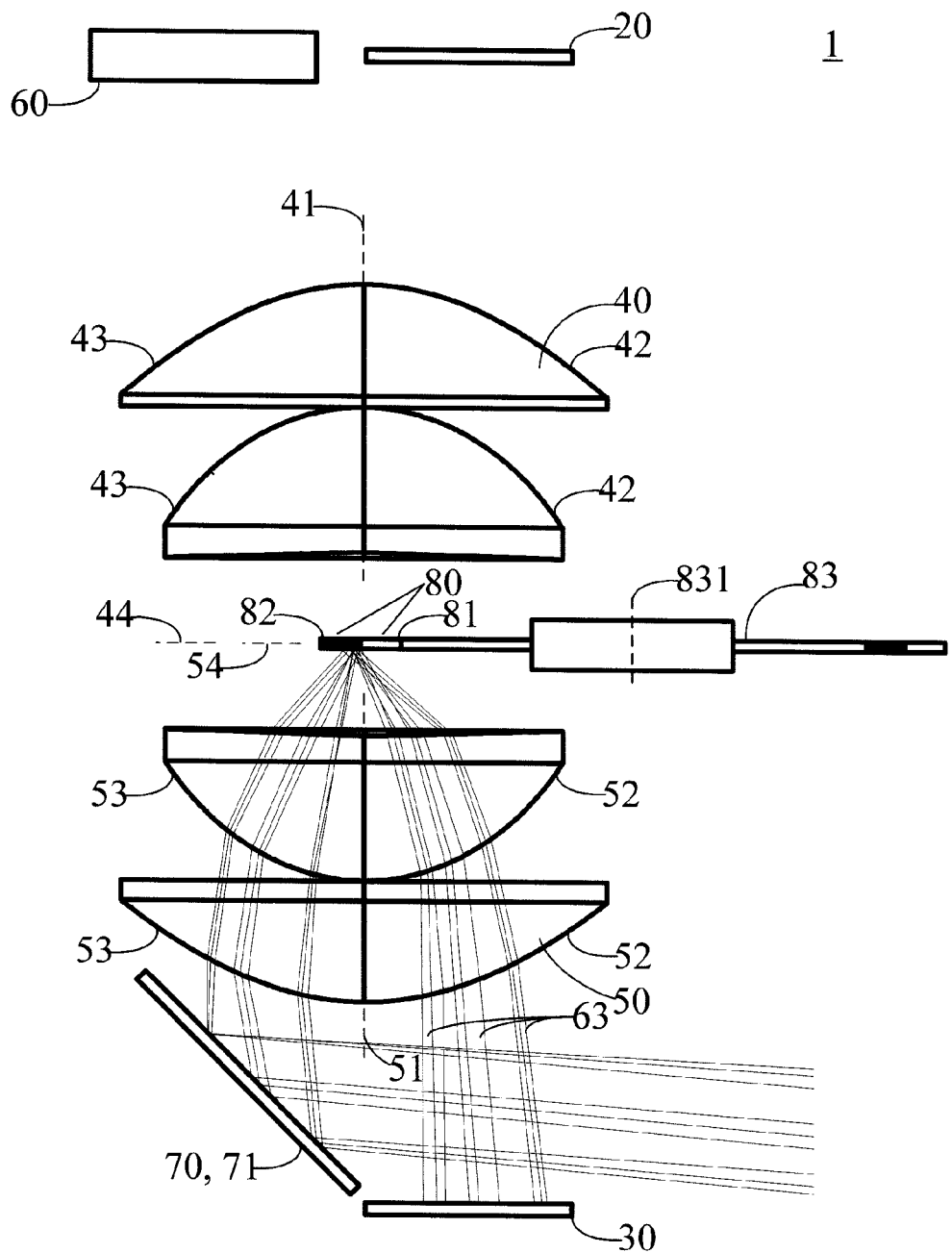
Figure 4F:
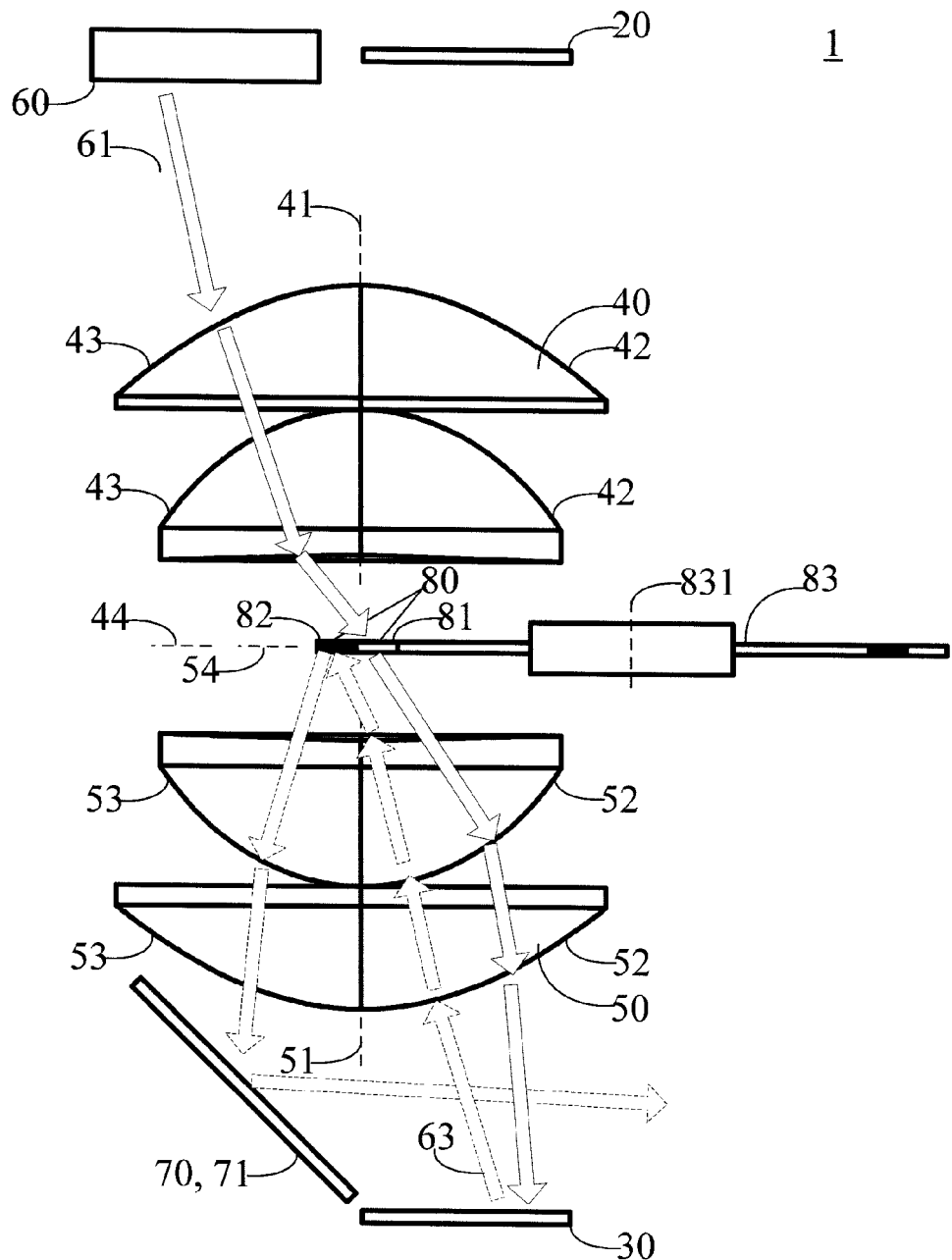

FIGS. 4D, 4E and 4F illustrate three schematic views respectively of the optical path of the light source system for a stereoscopic image of FIG. 1 at the second timing sequence.

At the second timing sequence, the transmission area 81 becomes the second transmission portion 834 of the color wheel module 83 (as shown in FIG. 3), while the reflection area 82 becomes the second reflection portion 835 of the color wheel module 83 (as shown in FIG. 3).

As shown in FIG. 4D, the input light beam 61 propagates to the second multiband filter 30 through the second portion 43 of the first relay lens assembly 40, the transmission area 81 and the first portion 52 of the second relay lens assembly 50 sequentially. As shown in FIG. 4E, after being transferred to the second multiband filter 30, a portion (i.e., light beams of R2, G2 and B2 wavebands) of the input light beam 61 is reflected by the second multiband filter 30. The portion of the input light beam 61 that is reflected will be referred to as a second light beam 63 hereinafter.

With further reference to FIG. 4E, the second light beam 63 propagates to the reflection area 82 through the first portion 52 of the second relay lens assembly 50, and is reflected by the reflection area 82 so that the second light beam 63 propagates to the reflector 71 through the second portion 53 of the second relay lens assembly 50. Finally, the second light beam 63 is reflected by the reflector 71 and then exits from the light source system for a stereoscopic image 1 between the second multiband filter 30 and the first portion 52.

In general, the optical paths of the input light beam 61 and the second light beam 63 are as shown in FIG. 4F.

After being outputted from the light source system for a stereoscopic image 1, the second light beam 63 is also transferred to a beam splitting prism (not shown) of the projector where it is split into a plurality of light beams. That is, the second light beam 63 is split into three light beams of R2, G2 and B2 wavebands. The three light beams are then transferred to three light modulators (not shown) of the projector respectively so that a second view-angle image is outputted by the projector.

According to the above descriptions, the light source system for a stereoscopic image 1 can allow the projector to output the first view-angle images and second view-angle images alternately.

Figure 5:
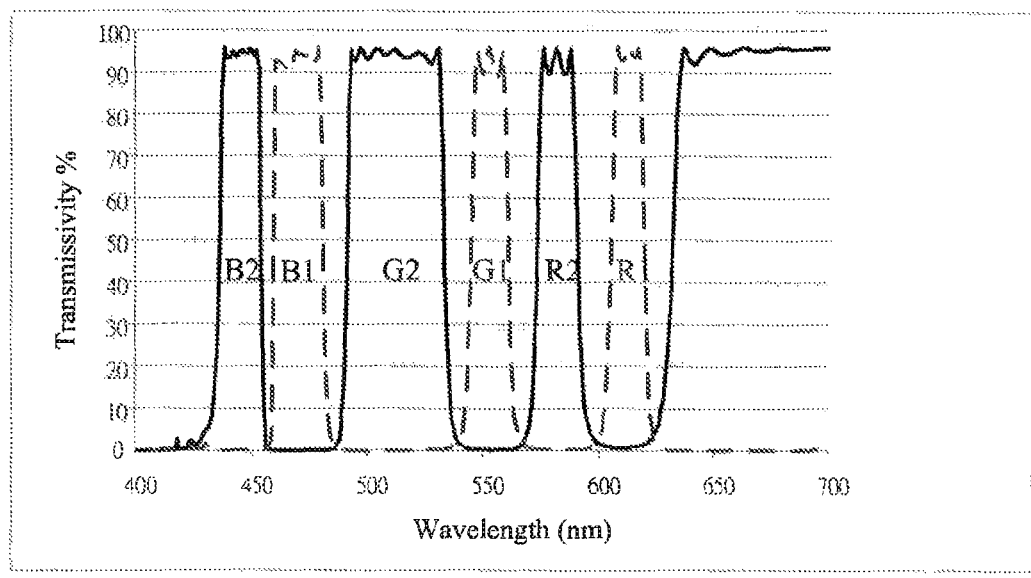
FIG. 5 is a schematic diagram illustrating wavebands versus the transmissivity of a pair of passive glasses.

To watch the first view-angle image and the second view-angle image, a viewer needs to wear a pair of passive glasses (not shown). FIG. 5 illustrates a schematic diagram of wavebands versus the transmissivity of a pair of passive glasses. The right-eye glass of the passive glasses allows only light beams of R1, G1 and B1 wavebands to pass therethrough, while the left-eye glass allows only light beams of R2, G2 and B2 wavebands to pass therethrough. Thus, only the first view-angle image is received by the right eye of the viewer, and only the second view-angle image is received by the left eye of the viewer. Then, a stereoscopic image is perceived in the brain of the viewer.

With reference back to FIGS. 4C and 4F, it shall be appreciated that "the light valve device 80 may be disposed on the first focal plane 44 or the second focal plane 54" and "the transmission area 81 and the reflection area 82 may be disposed at both sides of the optical axis 41 (or the optical axis 51) respectively" as mentioned hereinabove. The purpose of this configuration is to allow the input light beam 61, the first light beam 62 and the second light beam 63 to be converged only to the transmission area 81 by the first relay lens assembly 40 or the second relay lens assembly 50 without being partially transferred to the reflection area 82; and vice versa.

Figure 6:
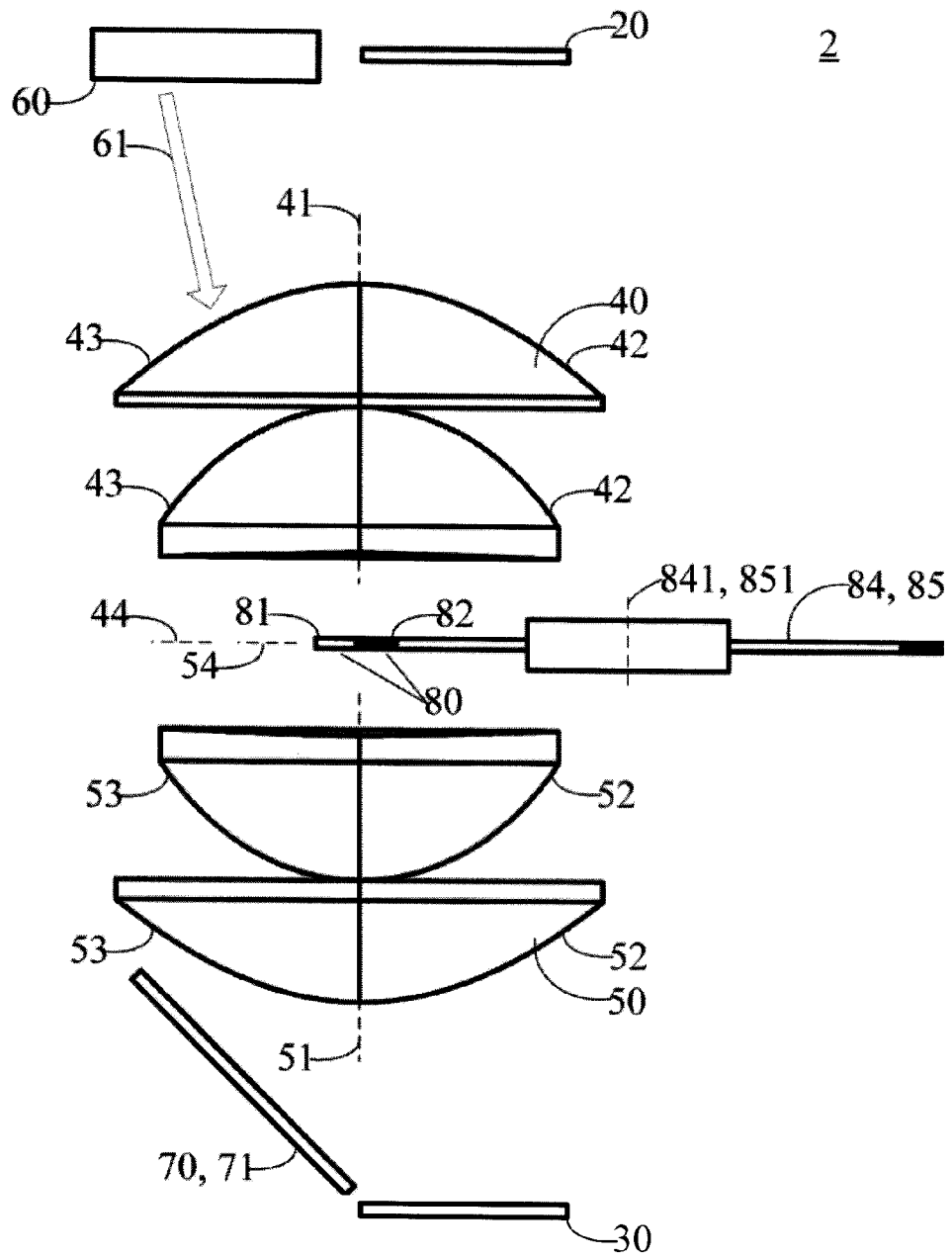
FIG. 6 is a schematic view of a light source system for a stereoscopic image according to the second preferred embodiment of the present invention.

FIG. 6 illustrates a schematic view of a light source system for a stereoscopic image according to the second preferred embodiment of the present invention. In the second embodiment, another light source system for a stereoscopic image 2 is proposed. The light source system for a stereoscopic image 2 is similar to the light source system for a stereoscopic image 1 but is different therefrom in that another color wheel module 84 is used as a light valve device 80 of the light source system for a stereoscopic image 2.

Figure 7:
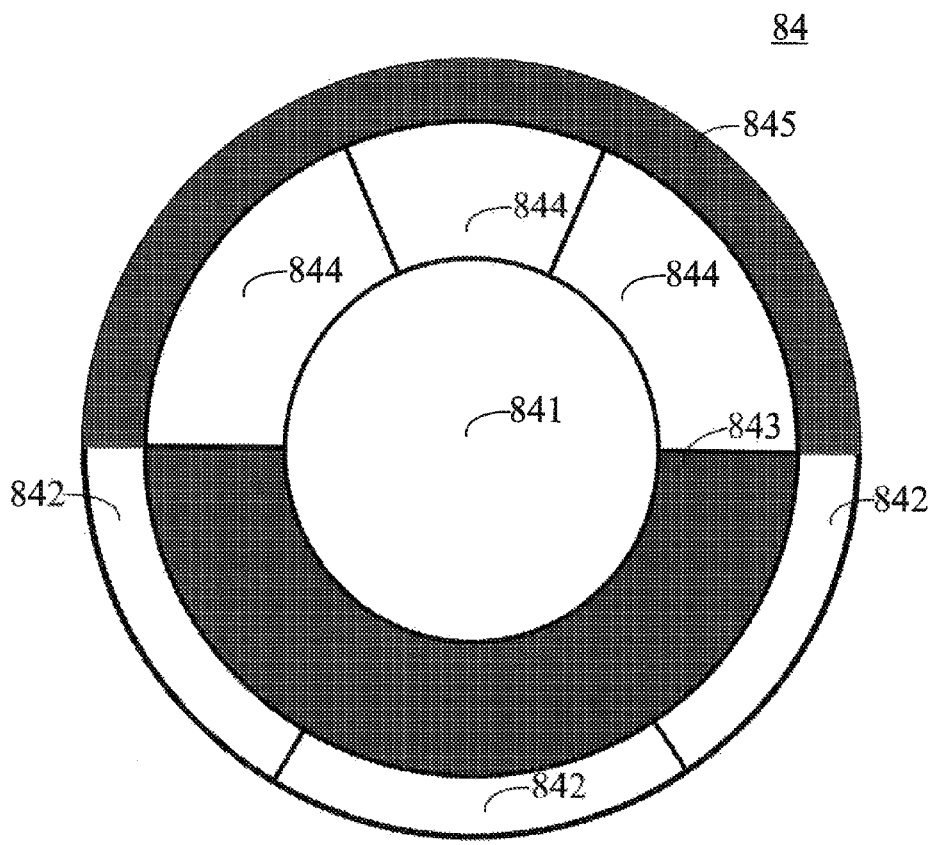
FIG. 7 is a schematic view of a color wheel module of the light source system for a stereoscopic image shown in FIG. 6.

FIG. 7 illustrates a schematic view of the color wheel module of the light source system for a stereoscopic image of FIG. 6. The color wheel module 84 has a color wheel axis 841, a plurality of first filter portions 842, a first reflection portion 843, a plurality of second filter portions 844 and a second reflection portion 845. The first reflection portion 843 and the plurality of second filter portions 844 are disposed at both sides of the color wheel axis 841 respectively. The plurality of first filter portions 842 are disposed at the outer side of the first reflection portion 843, while the second reflection portion 845 is disposed at the outer side of the plurality of second filter portions 844.

The plurality of first filter portions 842 may comprise a red filter portion, a green filter portion and a blue filter portion. The plurality of second filter portions 844 may comprise a red filter portion, a green filter portion and a blue filter portion. The red filter portions allow only light beams of red wavebands (i.e., R1 and R2) to pass therethrough, the green filter portions allow only light beams of green wavebands (i.e., G1 and G2) to pass therethrough, and the blue filter portions allow only light beams of blue wavebands (i.e., B1 and B2) to pass therethrough.

The plurality of first filter portions 842 and the plurality of second filter portions 844 form the transmission area 81 of the light valve device 80 together, while the first reflection portion 843 and the second reflection portion 845 form the reflection area 82 together.

Similar to the operation procedure of the light source system for a stereoscopic image 1, the operation procedure of the light source system for a stereoscopic image 2 may be divided into a first timing sequence and a second timing sequence. However, the first timing sequence and the second timing sequence of the light source system for a stereoscopic image 2 are each subdivided into three sub-timing sequences.

Figure 8A:
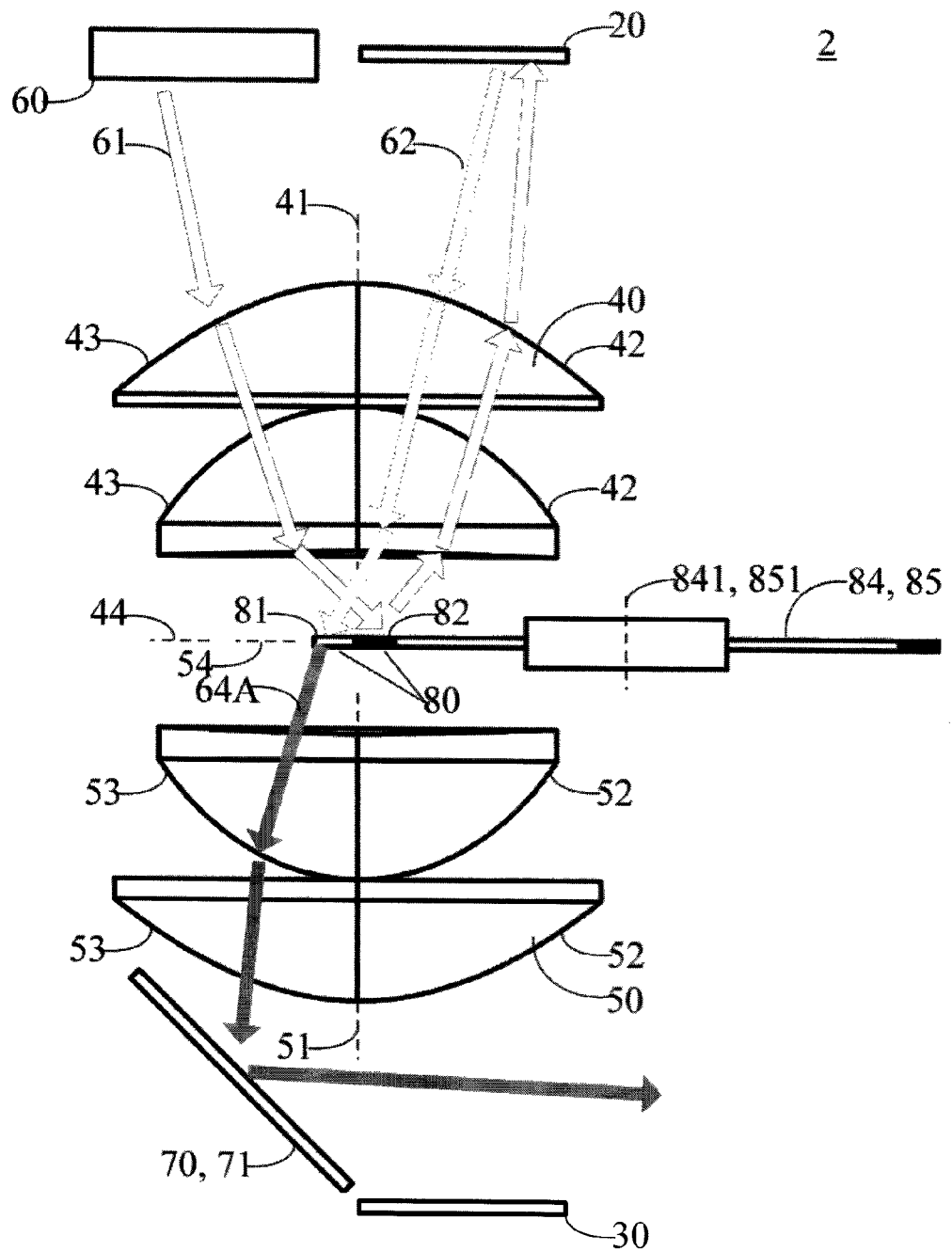
FIG. 8A is a schematic view illustrating the optical path of the light source system for a stereoscopic image of FIG. 6 at the first timing sequence.

FIG. 8A illustrates a schematic view of the optical path of the light source system for a stereoscopic image of FIG. 6 at the first timing sequence.

At the first sub-timing sequence of the first timing sequence, the transmission area 81 is the red filter portion among the plurality of first filter portions 842 of the color wheel module 84, while the reflection area 82 is the first reflection portion 843 of the color wheel module 84.

The input light beam 61 first propagates to the reflection area 82 through the second portion 43 of the first relay lens assembly 40, and is reflected by the reflection area 82 so that the input light beam 61 propagates to the first multiband filter 20 through the first portion 42 of the first relay lens assembly 40. The first light beam 62 (i.e., light beams of R1, G1 and B1 wavebands) is generated through the reflection of the input light beam 61 by the first multiband filter 20.

The first light beam 62 propagates to the transmission area 81 through the first portion 42 of the first relay lens assembly 40, while the first filtered light beam 64A is filtered out of the first light beam 62 by the transmission area 81. Since the transmission area 81 now is the red filter portion, the first filtered light beam 64A is a red light beam that only has a wavelength of R1.

The first filtered light beam 64A propagates to the reflector 71 through the second portion 53 of the second relay lens assembly 50 and then exits from the light source system for a stereoscopic image 2 between the second multiband filter 30 and the first portion 52.

At the second sub-timing sequence of the first timing sequence, the transmission area 81 becomes the green filter portion among the plurality of first filter portions 842, so the first filtered light beam 64A now is a green light beam that only has a wavelength of G1. At the third sub-timing sequence of the first timing sequence, the transmission area 81 becomes the blue filter portion among the plurality of first filter portions 842, so the first filtered light beam 64A now is a blue light beam that only has a wavelength of B1.

In general, at the first timing sequence, the light source system for a stereoscopic image 2 can output the first filtered light beams 64A of R1, G1 and B1 wavebands sequentially. Each of the first filtered light beams 64A may then be sequentially transferred to a light modulator (not shown) of the projector so that the first view-angle image is outputted by the projector.

Figure 8B:
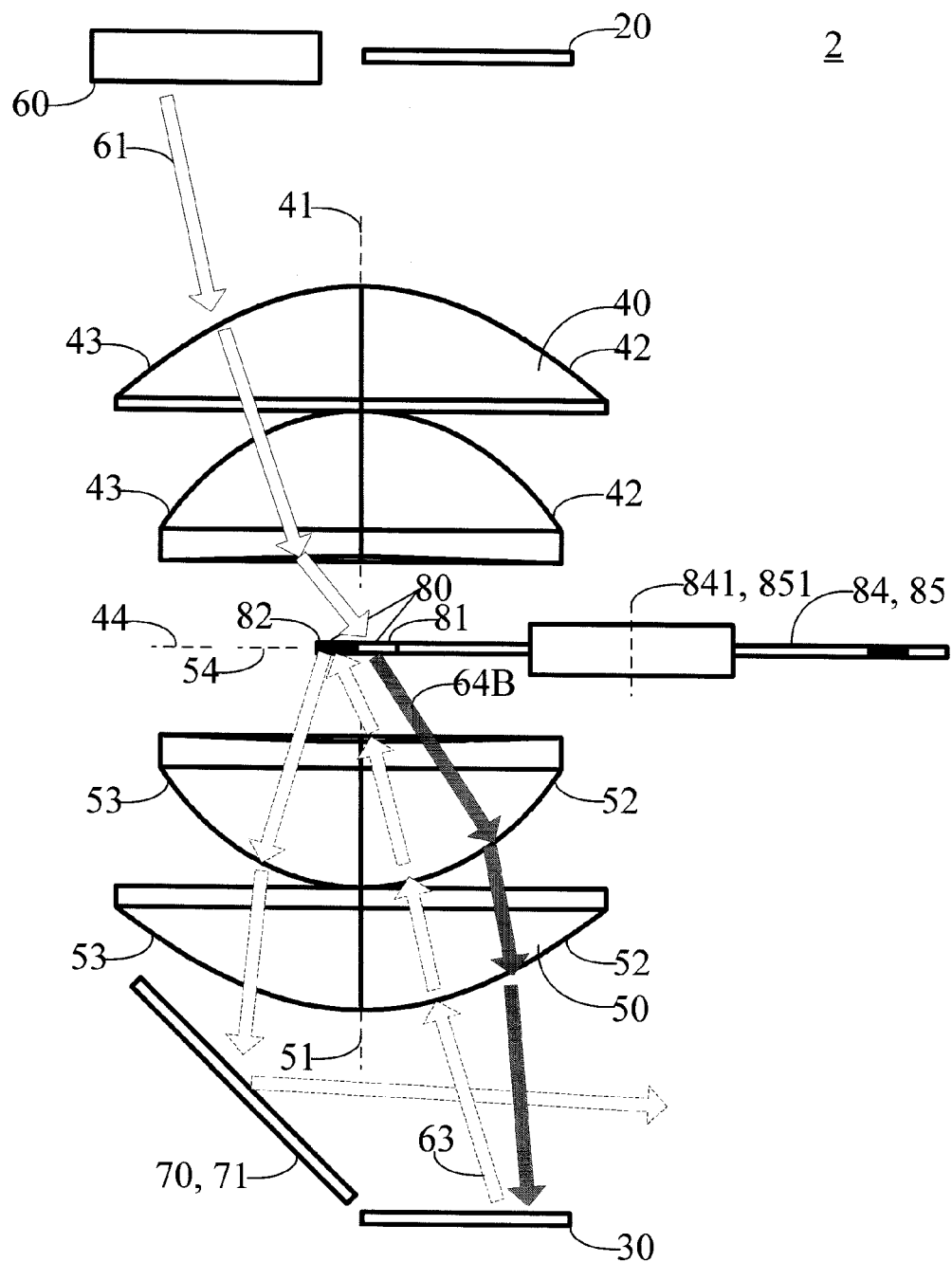
FIG. 8B is a schematic view illustrating the optical path of the light source system for a stereoscopic image of FIG. 6 at the second timing sequence.

FIG. 8B illustrates a schematic view of the optical path of the light source system for a stereoscopic image of FIG. 6 at the second timing sequence.

At the first sub-timing sequence of the second timing sequence, the transmission area 81 becomes the red filter portion among the plurality of second filter portions 844, while the reflection area 82 becomes the second reflection portion 845. The input light beam 61 first propagates to the transmission area 81 through the second portion 43 of the first relay lens assembly 40. The second filtered light beam 64B is filtered out of the first light beam 62 by the transmission area 81. Since the transmission area 81 is the red filter portion, the second filtered light beam 64B only has a wavelength of red (which comprises R1 and R2).

Next, the second filtered light beam 64B propagates to the second multiband filter 30 through the first portion 52 of the second relay lens assembly 50. Then, a second light beam 63 is generated through reflection of the second filtered light beam 64B by the second multiband filter 30. The second light beam 63 now only has a R2 waveband.

Subsequently, the second light beam 63 propagates to the reflector 71 through the first portion 52 of the second relay lens assembly 50, the reflection area 82 and the second portion 53 and then exits from the light source system for a stereoscopic image 2 between the second multiband filter 30 and the first portion 52.

At the second sub-timing sequence of the second timing sequence, the transmission area 81 becomes the green filter portion among the plurality of second filter portions 844, so the second light beam 63 now only has a wavelength of G2. At the third sub-timing sequence of the second timing sequence, the transmission area 81 becomes the blue filter portion among the plurality of second filter portions 844, so the second light beam 63 now only has a wavelength of B2.

In general, at the second timing sequence, the light source system for a stereoscopic image 2 can output the second light beams 63 of R2, G2 and B2 wavebands sequentially. Each of the second light beams 63 then may be sequentially transferred to a light modulator (not shown) of the projector so that a second view-angle image is outputted by the projector.

Figure 9:
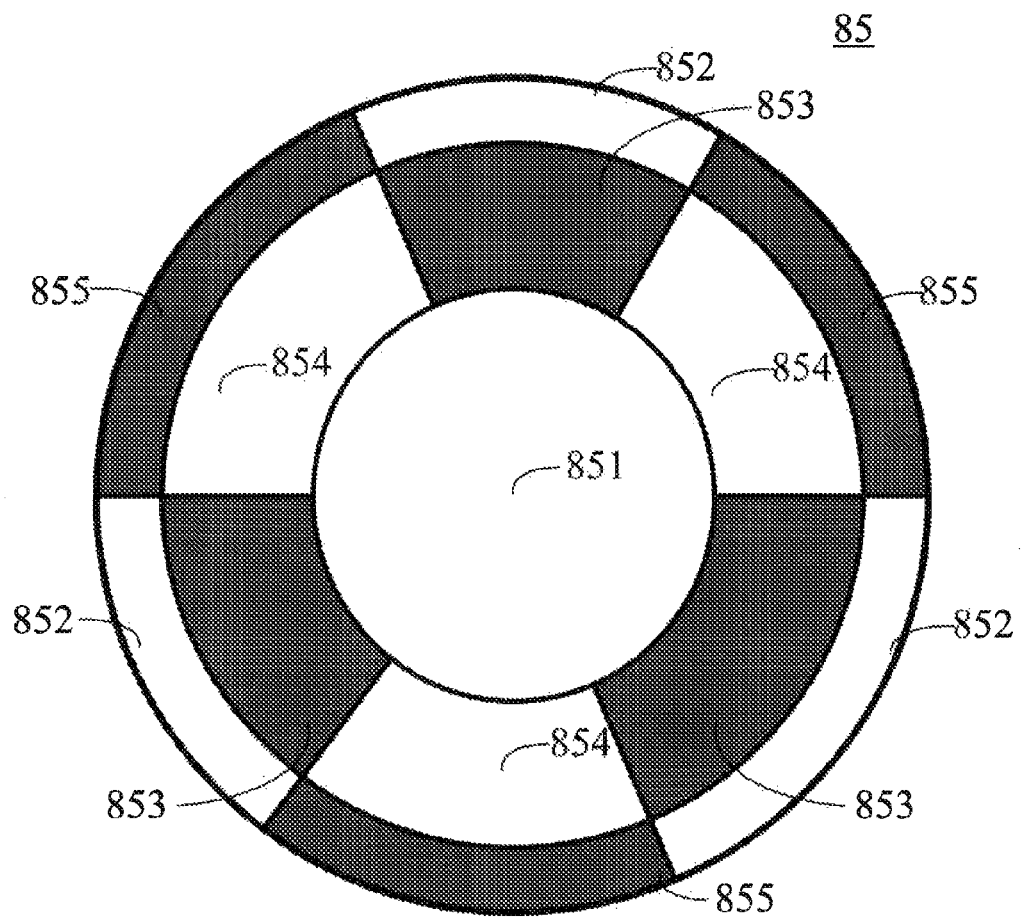
FIG. 9 is another schematic view of the color wheel module of the light source system for a stereoscopic image of FIG. 6.

FIG. 9 illustrates another schematic view of the color wheel module of the light source system for a stereoscopic image of FIG. 6. A further color wheel module 85 may be used as the light valve device 80 of the light source system for a stereoscopic image 2. In particular, the color wheel module 85 has a color wheel axis 851, a plurality of first filter portions 852, a plurality of first reflection portions 853, a plurality of second filter portions 854 and a plurality of second reflection portions 855. The plurality of first reflection portions 853 and the plurality of second filter portions 854 are disposed around the color wheel axis 851. The plurality of first filter portions 852 are disposed at the outer side of the plurality of first reflection portions 853 respectively. The plurality of second reflection portions 855 are disposed at the outer side of the plurality of second filter portions 854 respectively.

In addition, the plurality of first filter portions 852 and the plurality of second filter portions 854 form the transmission area 81 of the light valve device 80 together. The plurality of first reflection portions 853 and the plurality of second reflection portions 855 form the reflection area 82 of the light valve device 80 together.

The optical path within the light source system for a stereoscopic image 2 is also shown in FIG. 8A and FIG. 8B when the light source system for a stereoscopic image 2 operates in combination with the color wheel module 85. However, when operating in combination with the color wheel module 85, the light source system for a stereoscopic image 2 outputs "the first filtered light beam 64A of R1 waveband", "the second reflected light beam 63 of G2 waveband", "the first filtered light beam 64A of G1 waveband", "the second reflected light beam 63 of G2 waveband", "the first filtered light beam 64A of B1 waveband" and "the second reflected light beam 63 of B2 waveband" sequentially.

According to the above descriptions, the light source system for a stereoscopic image 2 can be used in combination with two kinds of color wheel modules 84 and 85, and the light source system for a stereoscopic image 2 is adapted for a projector with only a single light modulator.

Figure 10:
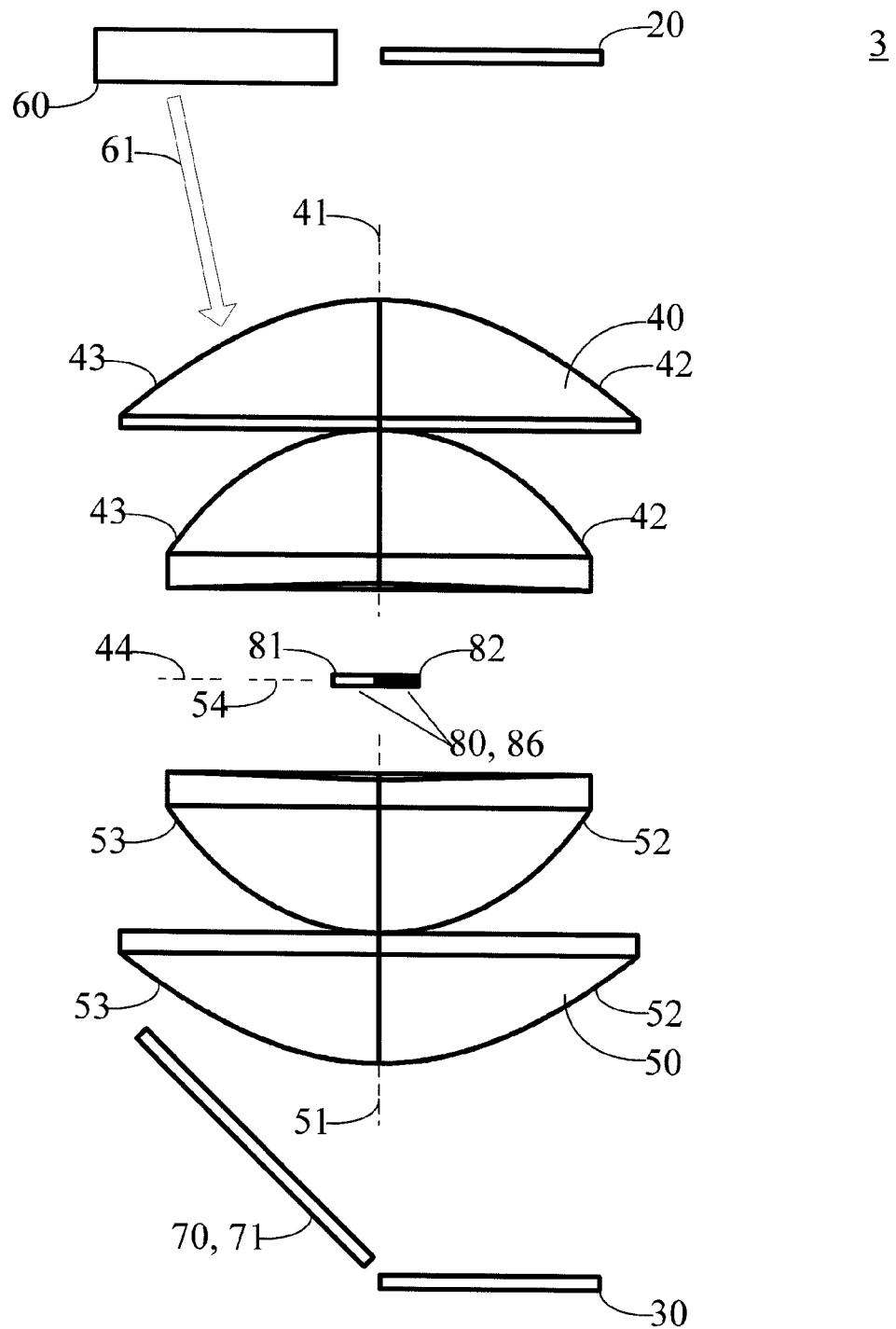
FIG. 10 is a schematic view of a light source system for a stereoscopic image according to the third preferred embodiment of the present invention.

FIG. 10 illustrates a schematic view of a light source system for a stereoscopic image according to the third preferred embodiment of the present invention. In the third embodiment, another light source system for a stereoscopic image 3 is proposed. The light source system for a stereoscopic image 3 is similar to the light source systems 1 and 2 for a stereoscopic image but different therefrom in that the light valve device 80 of the light source system for a stereoscopic image 3 is a pendulum device 86.

Figure 11:
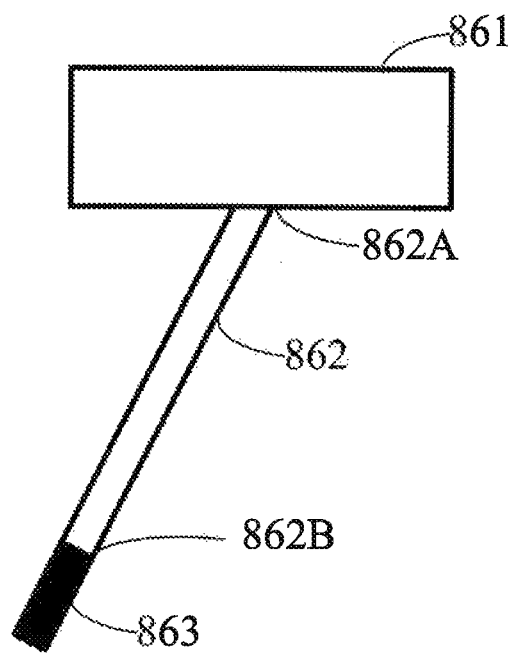
FIG. 11 is a schematic view of a pendulum device of the light source system for a stereoscopic image of FIG. 10.

FIG. 11 illustrates a schematic view of the pendulum device of the light source system for a stereoscopic image of FIG. 10. The pendulum device 86 comprises a driver 861, a rod 862 and a reflector 863. The driver 861 connects with the first end 862A of the rod 862 to drive the rod 862 to swing, and the reflector 863 is disposed at the second end 862B of the rod 862. The reflector 863 of the pendulum device 86 forms the reflection area 82 of the light valve device 80, and spaces at both sides of the reflector 863 form the transmission area 81 of the light valve device 80.

When the light source system for a stereoscopic image 3 operates, the rod 862 swings continuously to change the position of the reflector 863. The operation procedure of the light source system for a stereoscopic image 3 may be divided into a first timing sequence and a second timing sequence according to the position of the reflector 863.

Figure 12A:
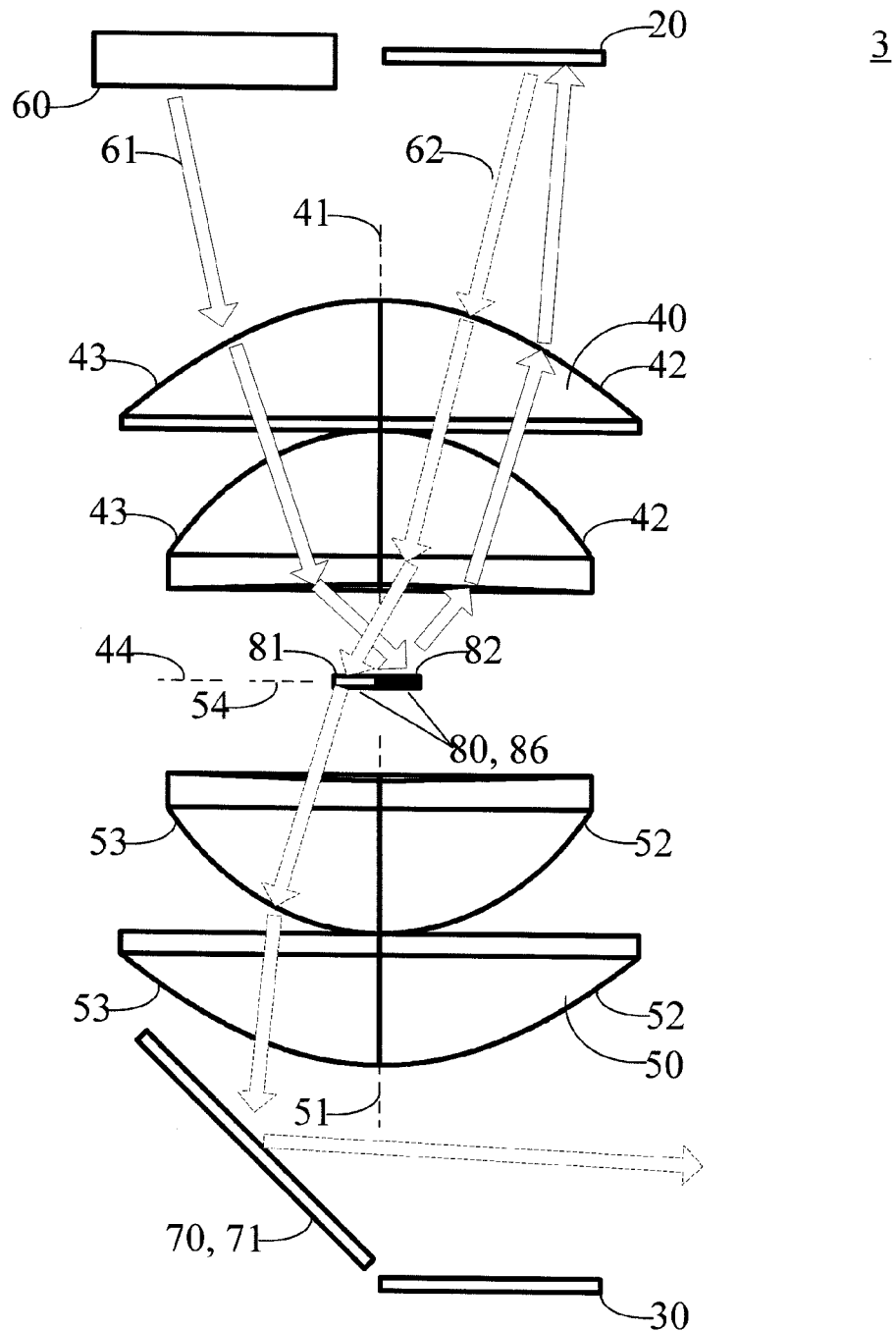
FIG. 12A is a schematic view illustrating the optical path of the light source system for a stereoscopic image according to the third preferred embodiment of the present invention at the first timing sequence.

At the first timing sequence, the reflector 863 is located between the first portion 42 and the first portion 52, while the space to the left of the reflector 863 can be used as the transmission area 81. The optical path within the light source system for a stereoscopic image 3 is now as shown in FIG. 12A. At the second timing sequence, the reflector 863 is located between the second portion 43 and the second portion 53, while the space to the right of the reflector 863 can be used as the transmission area 81. The optical path within the light source system for a stereoscopic image 3 is now as shown in FIG. 12B.

The light valve device 80 of the light source system for a stereoscopic image 3 may also be an electromagnetic valve device (not shown).

In particular, the electromagnetic valve device is electrically controllable so that whether light beams pass through the electromagnetic valve device or are reflected by the electromagnetic valve device is controllable. In this way, the functions of the reflection area 82 and the transmission area 81 of the light valve device 80 are fulfilled.

Figure 12B:
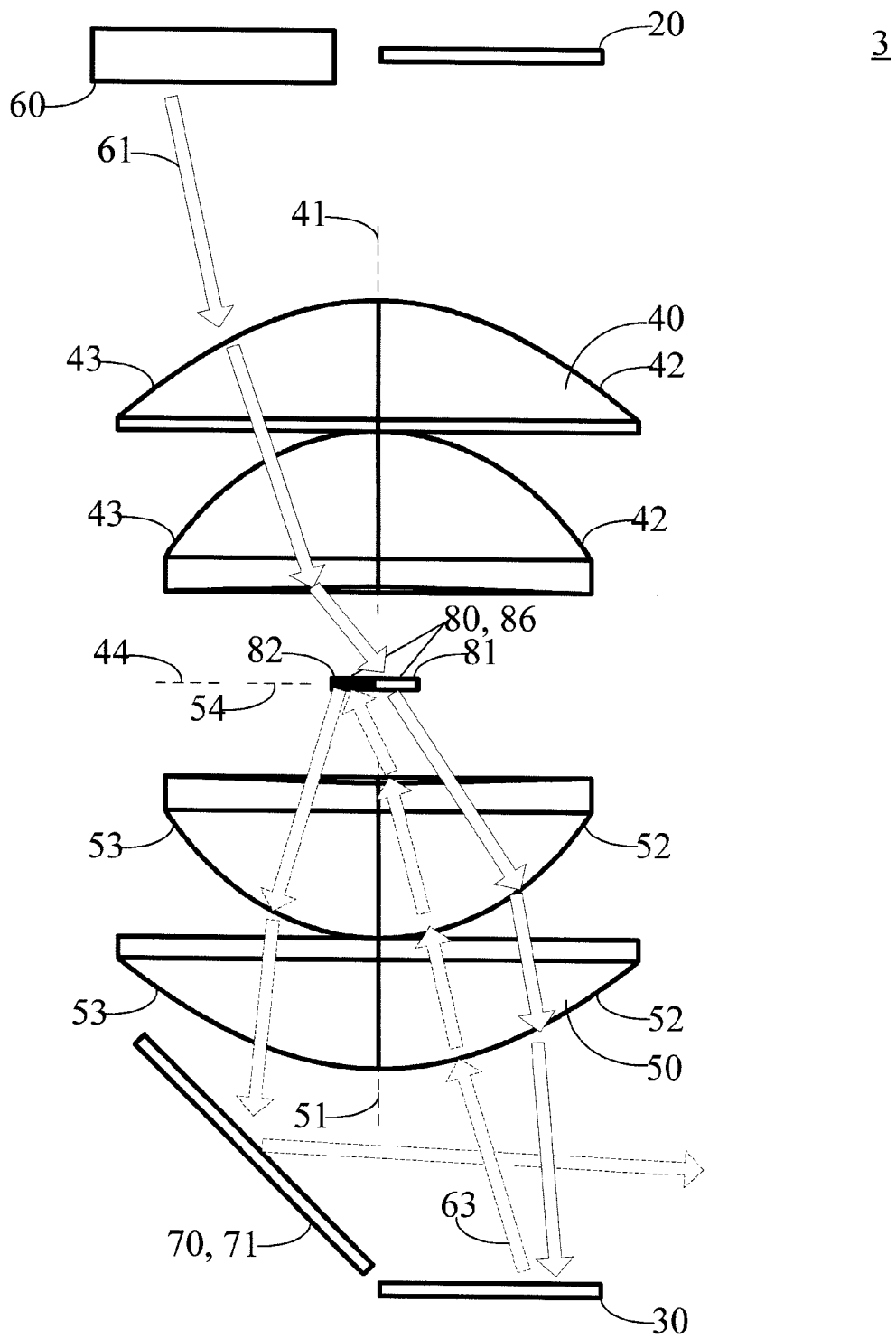
FIG. 12B is a schematic view illustrating the optical path of the light source system for a stereoscopic image according to the third preferred embodiment of the present invention at the second timing sequence.

The optical path within the light source system for a stereoscopic image 3 is shown in FIGS. 12A and 12B when the light source system for a stereoscopic image 3 operates in combination with the electromagnetic valve device.

According to the above descriptions, the light source system for a stereoscopic image 3 can be used in combination with the pendulum device 86 and the electromagnetic valve device, and can output the first light beams 62 of R1, G1 and B1 wavebands simultaneously at the first timing sequence and the second light beams 63 of R2, G2 and B2 wavebands simultaneously at the second timing sequence. Therefore, like the light source system for the stereoscopic image 1, the light source system for a stereoscopic image 3 can also generate stereoscopic images when being used in combination with three light modulators.

Figure 13A:
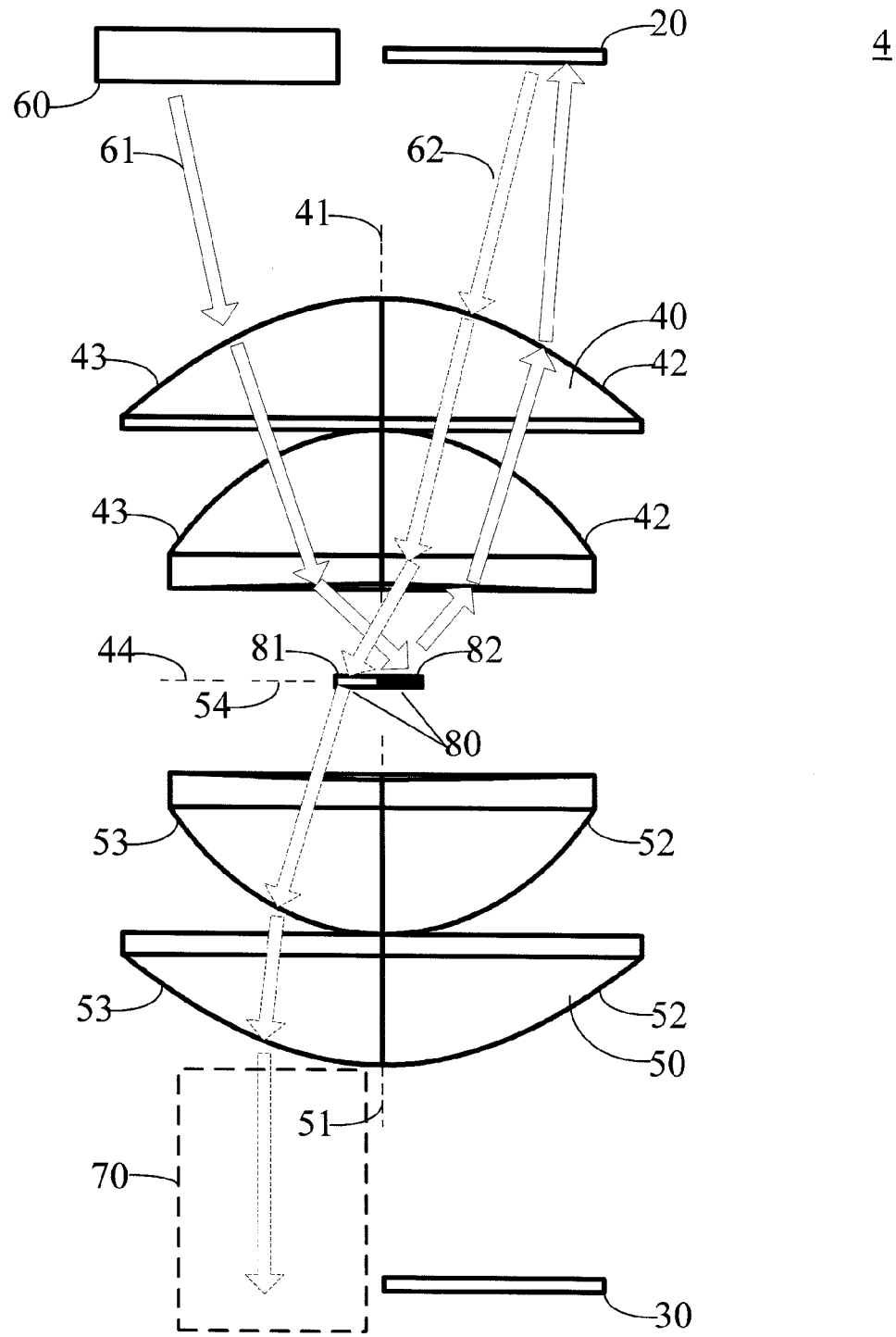
FIGS. 13A and 13B are two schematic views respectively illustrating the optical path of a light source system for a stereoscopic image according to the fourth preferred embodiment of the present invention.
Figure 13B:
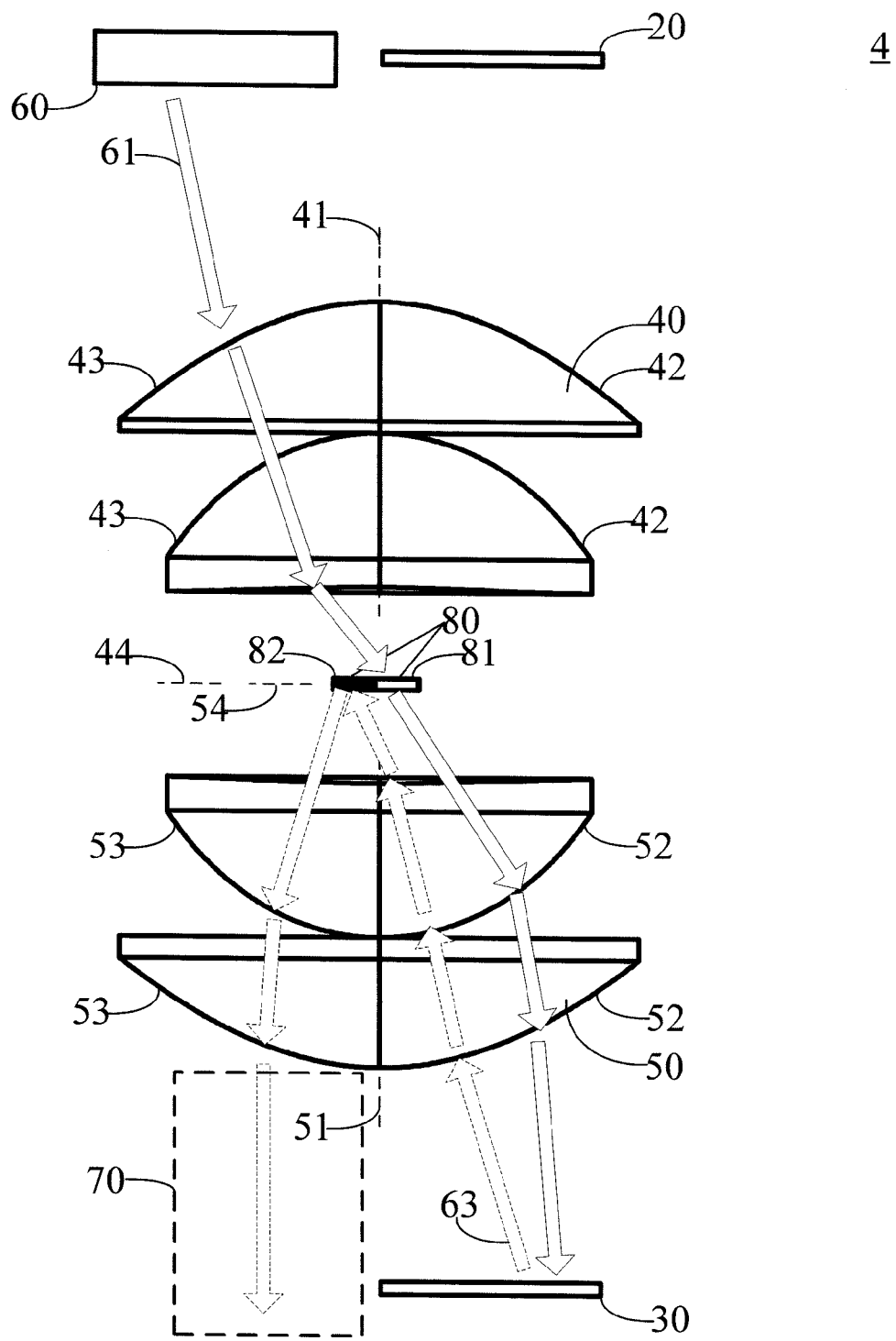

FIGS. 13A and 13B illustrate two schematic views of the optical path of a light source system for a stereoscopic image according to the fourth preferred embodiment of the present invention. In the fourth embodiment, a further light source system 4 for a stereoscopic image is proposed. The light source system 4 for a stereoscopic image is different from light source systems 1 to 3 for a stereoscopic image in that the light outputting portion 70 of the light source system 4 for a stereoscopic image has no reflector.

Because there is no reflector, the first light beam 62 is outputted next to the second multiband filter 30 at the first timing sequence (as shown in FIG. 13A) and the second light beam 63 is outputted next to the second multiband filter 30 at the second timing sequence (as shown in FIG. 13B).

According to the above descriptions, the light source system for a stereoscopic image of the present invention has at least the following features:

1. The light source system for a stereoscopic image can allow a projector to generate a stereoscopic image;
2. The light source system for a stereoscopic image can be used in a projector with either a plurality of light modulators or a single light modulator;

3. The light source system for a stereoscopic image can have a color wheel module with a relatively small diameter or no color wheel module at all;

4. Relay lens assemblies of the light source system for a stereoscopic image can allow light beams to impinge on multiband filters at a small solid angle to reduce the light loss of the light beams; and 5. The light source system for a stereoscopic image can have at least two light outputting directions to be adapted for projectors with different arrangements.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light source system for stereoscopic image comprising:
    a first multiband filter and a second multiband filter;
    a first relay lens assembly, being disposed between the first multiband filter and the second multiband filter, wherein the first relay lens assembly comprises an optical axis, a first portion and a second portion, the first portion and the second portion are disposed at both sides of the optical axis respectively, and the first portion and the first multiband filter are opposite to each other;
    a second relay lens assembly, disposed between the first multiband filter and the second multiband filter, wherein the second relay lens assembly comprises an optical axis, a first portion and a second portion, the first portion and the second portion of the second relay lens assembly are disposed at both sides of the optical axis respectively of the second relay lens assembly, and the first portion of the second relay lens assembly and the second multiband filter are opposite to each other;
    a light source module, wherein the light source module and the first multiband filter are disposed at one side of the first relay lens assembly together;
    a light outputting portion, wherein the light outputting portion and the second multiband filter are disposed at one side of the second relay lens assembly together; and
    a light valve device, being disposed between the first relay lens assembly and the second relay lens assembly, and comprising a transmission area and a reflection area.

2. The system of claim 1, wherein the light valve device is disposed on a first focal plane of the first relay lens assembly.

3. The system of claim 1, wherein the light valve device is disposed on a second focal plane of the second relay lens assembly.

4. The system of claim 2, wherein the light valve device is disposed on a second focal plane of the second relay lens assembly.

5. The system of claim 1, wherein the transmission area and the reflection area of the light valve device are disposed at both sides of the optical axis of the first relay lens assembly respectively.

6. The system of claim 5, wherein the transmission area and the reflection area of the light valve device are disposed at both sides of the optical axis of the second relay lens assembly respectively.

7. The system of claim 1, wherein the light valve device is a color wheel module, and the color wheel module comprises: a color wheel axis, a first transmission portion, a first reflection portion, a second transmission portion and a second reflection portion;
    wherein the first reflection portion and the second transmission portion are disposed at both sides of the color wheel axis respectively, the first transmission portion is disposed at an outer side of the first reflection portion, and the second reflection portion is disposed at an outer side of the second transmission portion;
    wherein the first transmission portion and the second transmission portion form the transmission area together, and the first reflection portion and the second reflection portion form the reflection area together.

8. The system of claim 1, wherein the light valve device is a color wheel module, and the color wheel module comprises: a color wheel axis, a plurality of first filter portions, at least one first reflection portion, a plurality of second filter portions and at least one second reflection portion;
    wherein, the at least one first reflection portion and the plurality of second filter portions are disposed at both sides of the color wheel axis respectively, the plurality of first filter portions are disposed at an outer side of the at least one first reflection portion, and the at least one second reflection portion is disposed at an outer side of the plurality of second filter portions;
    wherein, the plurality of first filter portions and the plurality of second filter portions form the transmission area together, and the at least one first reflection portion and the at least one second reflection portion form the reflection area together.

9. The system of claim 1, wherein the light valve device is a color wheel module, and the color wheel module comprises: a color wheel axis, a plurality of first filter portions, a plurality of first reflection portion, a plurality of second filter portions and a plurality of second reflection portions;
    wherein, the plurality of first reflection portions and the plurality of second filter portions are disposed around the color wheel axis, the plurality of first filter portions are disposed at an outer side of the plurality of first reflection portions respectively, and the plurality of second reflection portions are disposed at an outer side of the plurality of second filter portions respectively;
    wherein, the plurality of first filter portions and the plurality of second filter portions form the transmission area together, and the plurality of first reflection portions and the plurality of second reflection portions form the reflection area together.

10. The system of claim 1, wherein the light valve device is an electromagnetic valve device.

11. The system of claim 1, wherein the light valve device is a pendulum device, the pendulum device further comprises a driver, a rod and a reflector, the driver connects with first end of the rod to drive the rod to swing, and the reflector is disposed at a second end of the rod; wherein, the reflector forms the reflection area, and spaces of both sides of the reflector form the transmission area.

12. The system of claim 1, wherein the light outputting portion further comprises a reflector and the reflector is opposite to the second portion of the second relay lens assembly.

* * * * *